United States Patent
Kim et al.

(10) Patent No.: US 9,752,268 B2
(45) Date of Patent: Sep. 5, 2017

(54) CONTROL METHOD OF WASHING MACHINE

(71) Applicant: LG ELECTRONICS INC., Seoul (KR)

(72) Inventors: Youngjong Kim, Seoul (KR); Sangjun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 204 days.

(21) Appl. No.: 14/601,877

(22) Filed: Jan. 21, 2015

(65) Prior Publication Data

US 2015/0204003 A1   Jul. 23, 2015

(30) Foreign Application Priority Data

Jan. 22, 2014   (KR) .................. 10-2014-0007912

(51) Int. Cl.
| | |
|---|---|
| G05B 5/00 | (2006.01) |
| H02H 7/08 | (2006.01) |
| H02P 1/00 | (2006.01) |
| H02P 3/00 | (2006.01) |
| H02P 7/00 | (2016.01) |

(Continued)

(52) U.S. Cl.
CPC ............ *D06F 37/304* (2013.01); *D06F 33/02* (2013.01); *D06F 37/36* (2013.01); *D06F 37/203* (2013.01); *D06F 37/40* (2013.01); *D06F 2202/10* (2013.01); *D06F 2202/12* (2013.01); *D06F 2204/065* (2013.01); *D06F 2204/10* (2013.01); *D06F 2700/04* (2013.01); *Y02B 40/52* (2013.01)

(58) Field of Classification Search
CPC . G04C 23/00; G05D 23/2754; E05F 15/0008; E05F 15/2092; E05Y 2400/66; D06F 37/203; D06F 35/006; D06F 33/02; D06F 39/003; D06F 35/007
USPC ............................................... 318/452; 8/159
See application file for complete search history.

(56) References Cited

U.S. PATENT DOCUMENTS 5,720,065 A * 2/1998 Myers .................. D06F 37/40
68/12.02
2001/0054204 A1* 12/2001 Ciancimino .......... D06F 37/203
8/159

(Continued)

FOREIGN PATENT DOCUMENTS

| CN | 1331410 | 1/2002 |
|---|---|---|
| CN | 1566447 | 1/2005 |

(Continued)

OTHER PUBLICATIONS

Chinese Office Action dated Jun. 23, 2016 issued in Application No. 201510033019.0 (with English translation).

*Primary Examiner* — Kawing Chan
*Assistant Examiner* — Bradley Brown
(74) *Attorney, Agent, or Firm* — Ked & Associates, LLP (57) ABSTRACT

A main motor is rotated at a predetermined target speed to determine whether a clutch has been normally operated during switching between a spin mode and an agitation mode. A current value sensed during rotation of the main motor is compared with a predetermined reference value to determine whether the clutch is normally operated. Mode switching is performed or the clutch is re-operated based on the determination result, thereby correctly performing switching between the spin mode and the agitation mode.

20 Claims, 6 Drawing Sheets

(51) Int. Cl.
*D06F 37/30* (2006.01)
*D06F 33/02* (2006.01)
*D06F 37/36* (2006.01)
D06F 37/20 (2006.01)
D06F 37/40 (2006.01)

(56) References Cited

U.S. PATENT DOCUMENTS

2006/0207299 A1\* 9/2006 Okazaki ............... D06F 39/003
  68/12.02
2011/0179584 A1\* 7/2011 Kim ....................... D06F 37/40
  8/137

FOREIGN PATENT DOCUMENTS

| CN | 1671907 | 9/2005 |
| CN | 1809661 | 7/2006 |
| CN | 102134796 | 7/2011 |
| EP | 1 995 366 | 11/2008 |

\* cited by examiner

CONTROL METHOD OF WASHING MACHINE

CROSS-REFERENCE TO RELATED APPLICATION

This application claims priority under 35 U.S.C. §119 to Korean Application No. 10-2014-0007912, filed Jan. 22, 2014, whose entire disclosure is hereby incorporated by reference.

BACKGROUND

1. Field

The present disclosure relates to a washing machine and a control method.

2. Background

In general, a laundry treatment apparatus commonly designates various kinds of apparatuses for treating laundry using physical and chemical actions. W washing machine removes contaminants from clothing, bedding, etc. (hereinafter, referred to as 'laundry') using a chemical decomposition action of water and detergent and a physical action, such as friction, between water and laundry. A drying machine spin-dries wet laundry to dry the wet laundry. A refresher sprays heated steam to laundry to prevent allergy due to the laundry and to conveniently wash the laundry.

A washing machine is classified as an agitator type washing machine, a drum type washing machine, or a pulsator type washing machine. In general, the washing machine sequentially performs a washing cycle, a rinsing cycle, and a spin-drying cycle to wash laundry. Some of the cycles may be performed according to user selection. A proper washing method is used to wash laundry according to the kind of the laundry.

In the washing machine, the washing cycle and the spin-drying cycle are basically performed. The agitator type washing machine and the pulsator type washing machine each include a washing shaft for rotating an agitator or a pulsator, a spin-drying shaft for rotating a tub together with the agitator or the pulsator, and a clutch for selectively connecting the washing shaft or the spin-drying shaft to a motor to connect or disconnect power such that the washing cycle and the spin-drying cycle can be selectively performed.

However, the clutch may not be connected to a driven unit due to weight of a drum and eccentricity of laundry in the drum. If a drive unit continuously operates without recognition thereof, the clutch, the driven unit, or the driving unit may be damaged.

BRIEF DESCRIPTION OF THE DRAWINGS

Embodiments will be described in detail with reference to the following drawings in which like reference numerals refer to like elements, and wherein.

DETAILED DESCRIPTION

Figure 1:
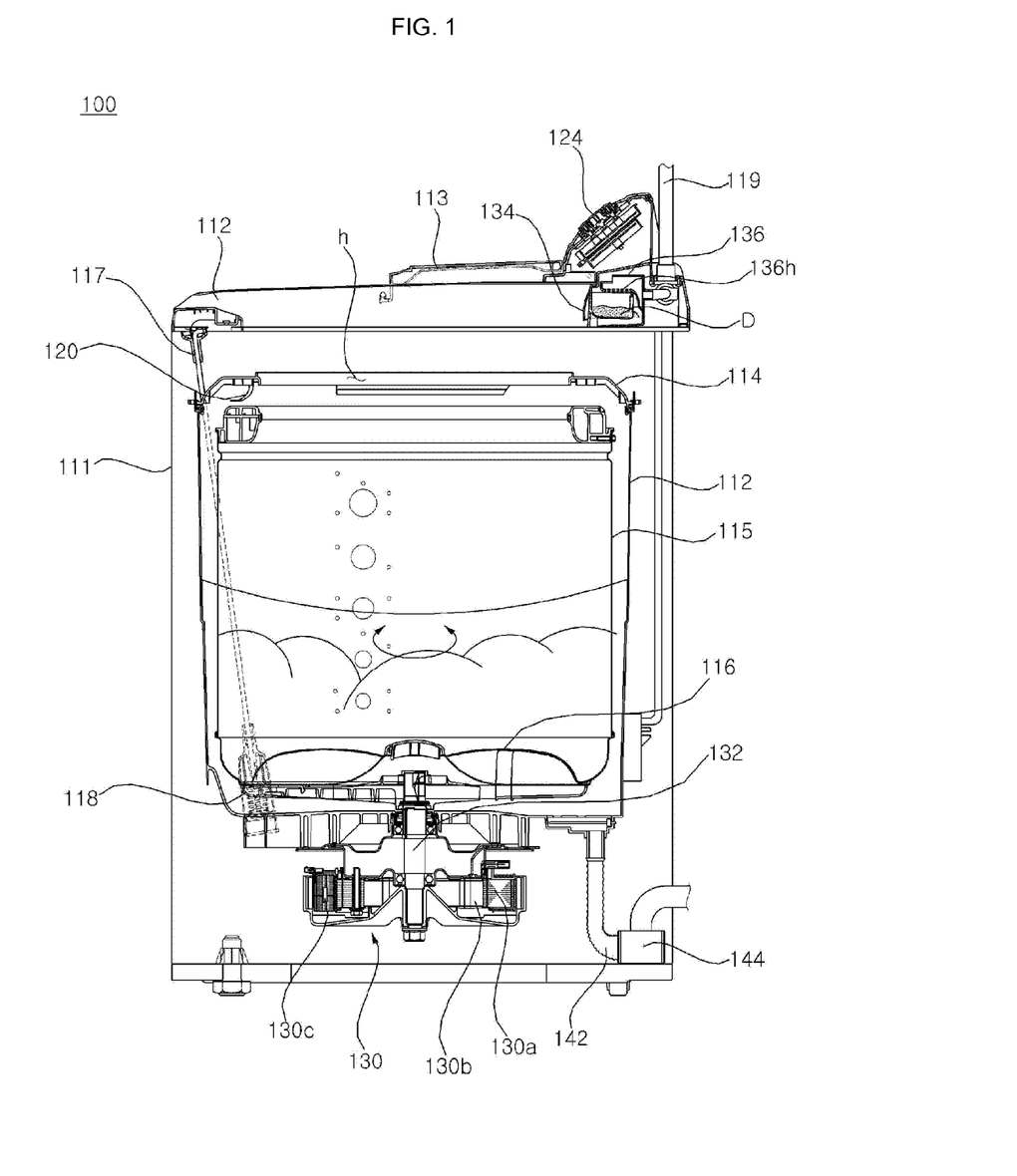
FIG. 1 is a sectional view showing a washing machine according to an embodiment of the present disclosure.

FIG. 1 is a sectional view showing a washing machine 100 according to an embodiment of the present disclosure. The washing machine 100 includes an inner tub 115, a pulsator 116 rotated in the inner tub 115, a main motor 130 for rotating the pulsator 116, and a clutch 240 for engaging the inner tub 115 with the main motor 130 or disengaging the inner tub 115 from the main motor 130.

The washing machine 100 includes a cabinet 111 forming the external appearance thereof. The cabinet 111 is open at the top thereof, and a cabinet cover 112 is disposed at the open top of the cabinet 111. The cabinet cover 112 includes a laundry introduction port, through which laundry is put into the washing machine 100 or removed from the washing machine 100, and a door 113 is used for opening and closing the laundry introduction port. An outer tub 122 is configured for receiving wash water, and the outer tub 122 is suspended in the cabinet 111 by a support member 117 and a damper 118. An inner tub 115 is disposed inside the outer tub 122 for receiving laundry, and the inner tub 115 is rotated about a vertical shaft.

The inner tub 115 is provided with a plurality of water holes (not shown), through which wash water circulates between the outer tub 122 and the inner tub 115. The outer tub 122 is provided at the top thereof with an outer tub cover 114 having a laundry introduction hole h, through which laundry is put into the inner tub 115 or removed from the inner tub 115.

The inner tub 115 is provided at the bottom thereof with a pulsator 116 for forming a water current in wash water. At the lower side of the outer tub 122 is disposed a main motor 130 for generating rotary power to rotate the inner tub 115 and/or the pulsator 116. Hereinafter, the inner tub 115 and/or the pulsator 116 will be commonly designated as water current forming units 115 and 116 for forming a water current in wash water. The main motor 130 rotates the water current forming units 115 and 116. The main motor 130 includes a stator 130a having coils wound thereon and a rotor 130b configured to rotate through electromagnetic interaction with the coils.

The stator 130a has a plurality of coils wound thereon and internal resistance. The rotor 130b has a plurality of magnets for inducing electromagnetic interaction with the coils. The rotor 130b rotates through the electromagnetic interaction between the coils and the magnets. Rotary power of the rotor 130b is transmitted to the water current forming units 115 and 116 to rotate the water current forming units 115 and 116.

The main motor 130 has a hall sensor 130c for measuring the position of the rotor 130b. The hall sensor 130c generates an ON/OFF signal according to the rotation of the rotor 130b. The rotational speed and position of the rotor 130b are estimated based on the ON/OFF signal generated by the hall sensor 130c.

A drainage hose 142 and a drainage pump 144 drain wash water from the outer tub 122. The cabinet cover 112 is provided with a control panel 124 for allowing input of a user command on overall operation of the washing machine 100. At the inside of the cabinet cover 112 are disposed a detergent box 134 for receiving detergent D and a detergent box housing 136, in which the detergent box 134 is disposed such that the detergent box 134 can be drawn out from the detergent box housing 136, the detergent box housing 136 forming a flow channel along which wash water introduced from a water supply hose 119 is supplied into the inner tub 115 via the detergent box 134. The detergent box housing 136 may have a distribution hole 136h, through which the wash water introduced from the water supply hose 119 is distributed to the detergent box 134.

Figure 2:
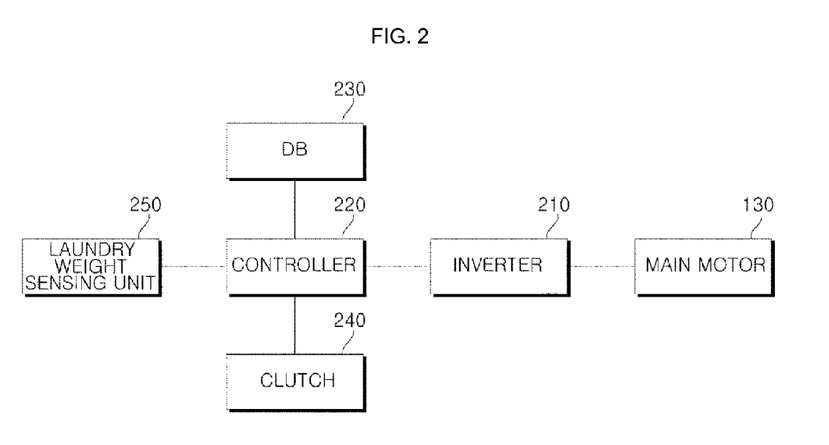
FIG. 2 is a block diagram of the washing machine according to the embodiment of the present disclosure.
Figure 3:
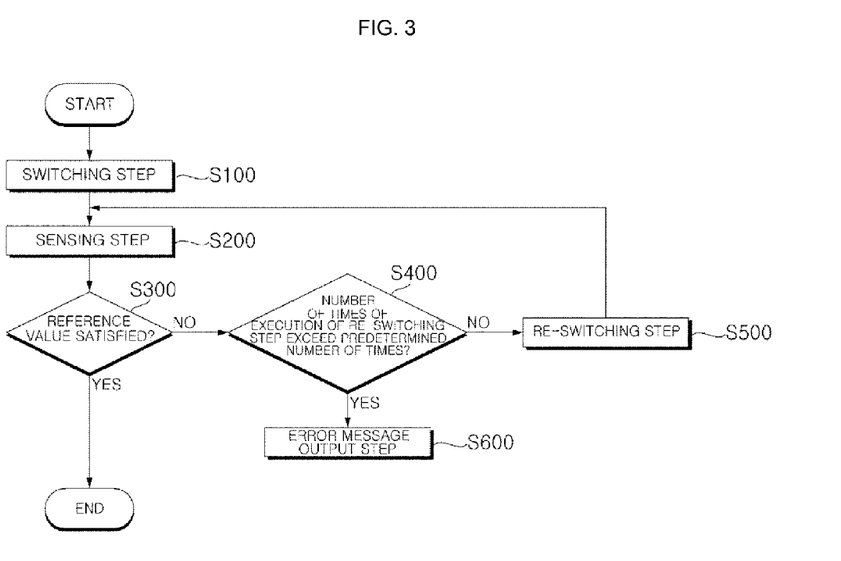
FIG. 3 is a flowchart showing a control method of a washing machine according to an embodiment of the present disclosure.

FIG. 2 is a block diagram of the washing machine 100 according to the embodiment of the present disclosure. FIG. 3 is a flowchart showing a control method of a washing machine 100 according to the embodiment of the present disclosure. The method according to an embodiment of the present disclosure includes (a) a step of executing a first mode corresponding to any one selected from between an agitation mode for driving the main motor 130 in a state in which the inner tub 115 is disengaged from the main motor 130 to rotate the pulsator 116 and a spin mode for driving the main motor 130 in a state in which the inner tub 115 is engaged with the main motor 130 to rotate both the inner tub 115 and the pulsator 116, (b) a step of operating the clutch 240 such that a second mode corresponding to the other selected from between the agitation mode and the spin mode can be executed, (c) a step of applying current to the main motor 130 such that the main motor 130 can be rotated at a predetermined target speed, (d) a step of comparing a value of the current applied to the main motor 130 with a predetermined reference value to determine whether the second mode can be executed, and (e) a step of executing the second mode according to a determination result at step (d).

Referring to FIGS. 2 and 3, the clutch 240 is a power switching unit. The clutch 240 transmits rotary power of the main motor 130 to the pulsator 116 and/or the inner tub 115. The clutch 240 switches between loads of the main motor 130. A controller 220 controls driving of the clutch 240 to realize a plurality of mode. The rotary shaft of the main motor 130 may be constantly connected to the pulsator 116. According to operation of the clutch 240, the rotary shaft of the main motor 130 may be engaged with the inner tub 115 (spin mode) or may be disengaged from the inner tub 115 (agitation mode).

A plurality of water current forming units 115 and 116 may be provided. The water current forming units 115 and 116 may be the inner tub 115 and the pulsator 116. The main motor 130 generates rotary power to be supplied to the inner tub 115 and the pulsator 116. The pulsator 116 and the inner tub 115 are rotated to form a rotary water current, which is a stream of wash water.

The controller 220 may realize the agitation mode and the spin mode. In the agitation mode, the main motor 130 may be rotated in alternating directions, and in the spin mode, the main motor 130 may be rotated in one direction. Alternatively, in the agitation mode, the pulsator 116 and the inner tub 115 may be rotated in opposite directions, and in the spin mode, the pulsator 116 and the inner tub 115 may be simultaneously rotated in the same direction.

A switching step (S100) is executed between the agitation mode and the spin mode. The controller 220 commands an inverter 210 to apply current to the main motor 130. A sensing step (S200) is executed after the switching step (S100). A reference value 10 may vary according to a mode to be changed. For example, in a case in which the spin mode is switched to the agitation mode, the reference value 10 may be set based on a load to be applied to the main motor 130 in the agitation mode. In another example, in a case in which the agitation mode is switched to the spin mode, the reference value 10 may be set based on a load to be applied to the main motor 130 in the spin mode. A re-switching step (S500) may be repeated until the current value applied to the main motor 130 satisfies the reference value 10.

Figure 4:
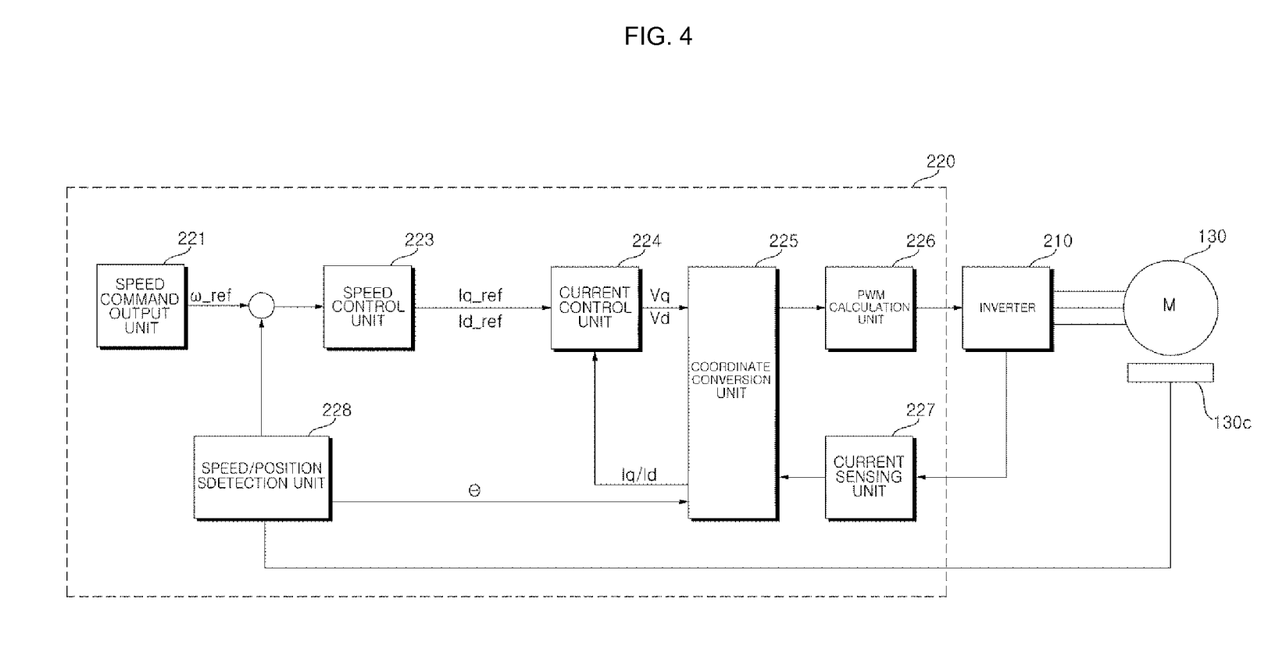
FIG. 4 is a block diagram showing a controller of FIG. 2 in more detail.
Figure 5:
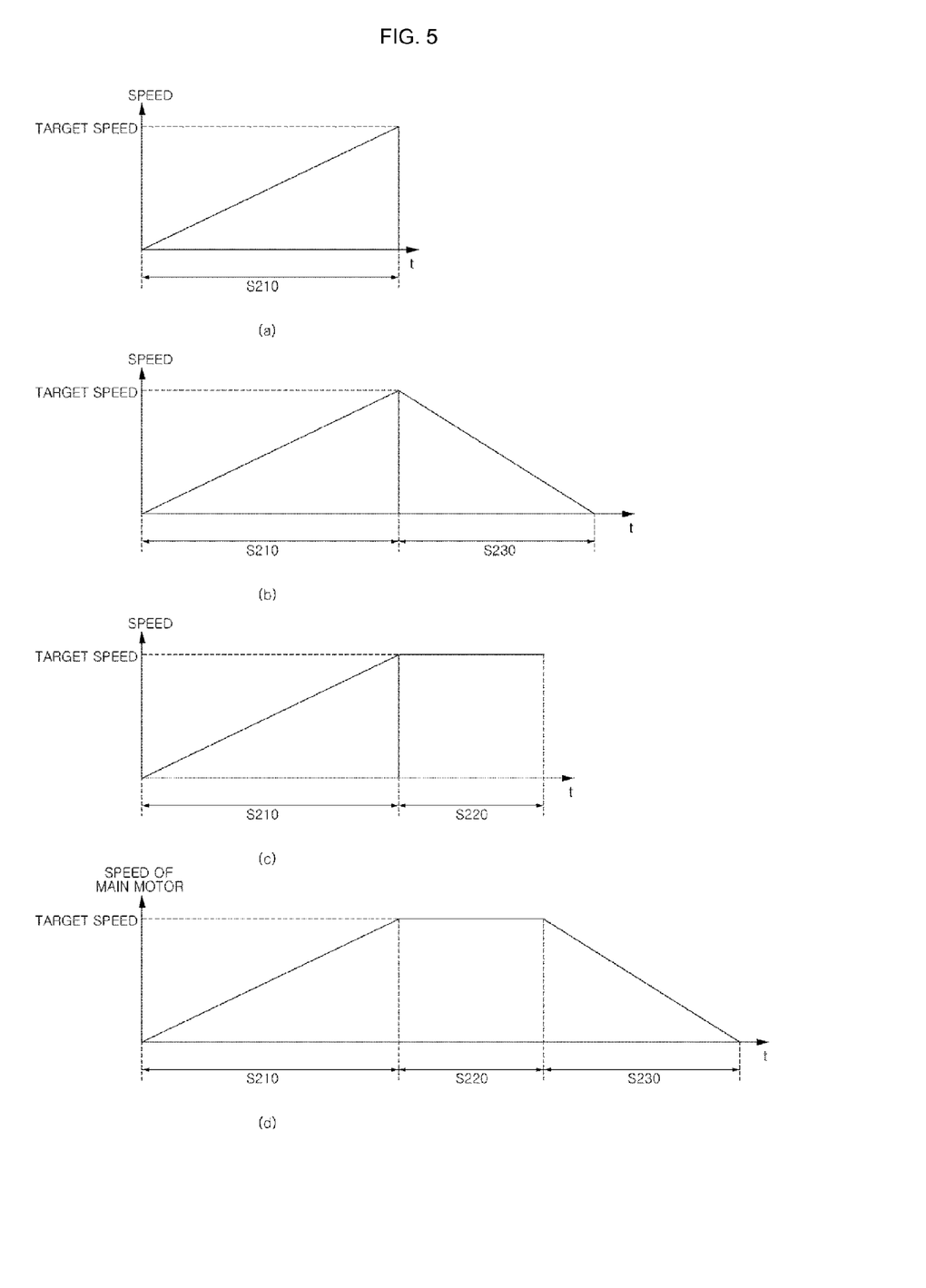
FIG. 5 is a view showing a sensing step in each embodiment.

FIG. 4 is a block diagram showing the controller 220 of FIG. 2 in more detail. FIG. 5 is a view showing the sensing step (S200) in each embodiment. The sensing step (S200) includes an acceleration step (S210) of increasing the speed of the main motor 130. In addition, the sensing step (S200) may include a deceleration step (S230) of braking the main motor 130. At the deceleration step (S230), current having a phase opposite to that of the current at the acceleration step (S210) may be applied to the main motor 130. According to embodiments, the sensing step (S200) may include a speed maintenance step (S220) of applying current to the main motor 130 such that the target speed of the main motor 130 can be maintained for a predetermined period of time.

The sensing step (S200) may be repeated. Whenever the sensing step (S200) is repeated, the rotational direction of the main motor 130 may be alternately changed.

The controller 220 controls the inverter 210. The controller 220 is constituted by a microprocessor, an inverter control timer (pulse width modulation (PWM) timer) mounted in the microprocessor, a high-speed analog/digital (A/D) conversion circuit, and memories, such as a read only memory (ROM) and a random access memory (RAM). The controller 220 may include a speed/position detection unit 228, a current sensing unit 227, a speed command output unit 221, a speed control unit 223, a current control unit 224, a coordinate conversion unit 225, and a PWM calculation unit 226.

The speed/position detection unit 228 detects a rotational speed w, which is a real rotational speed, and a position θ of the rotor 130b based on the position of the rotor 130b sensed by the hall sensor 130c. According to embodiments, the speed/position detection unit 228 may estimate the rotational speed ω and the position θ of the main motor 130 based on current sensed by the current sensing unit 227.

The current sensing unit 227 senses a current value output from the inverter 210. The current sensing unit 227 senses three-phase current values on a uvw fixed coordinate system output from the inverter 210. The three-phase current values on the uvw fixed coordinate system sensed by the current sensing unit 227 are converted into a d-axis current value Id and a q-axis current value Iq on a d- and q-axis rotating coordinate system defined by a d-axis parallel to a magnetic flux direction formed in the main motor 130 and a q-axis perpendicular to the magnetic flux direction by the coordinate conversion unit 225. The d-axis current value Id and the q-axis current value Iq are output. The speed command output unit 221 outputs a reference speed ω_ref, which is a target rotational speed, of the main motor 130 for properly rotating the water current forming units 115 and 116 according to an operation state of the washing machine 100.

The speed control unit 223 performs proportional integral derivative (PID) control based on a difference between the rotational speed ω and the reference speed ω_ref such that the rotational speed ω of the rotor 130b detected by the speed/position detection unit 228 follows the reference speed ω_ref and outputs a reference flux current value Id_ref, which is a current component corresponding to magnetic flux, and a reference torque current value Iq_ref, which is a current component corresponding to torque.

The reference flux current value Id_ref and the reference torque current value Iq_ref correspond to a d-axis reference current value Id_ref and a q-axis reference current value Iq_ref on the d- and q-axis rotating coordinate system, respectively. It is possible to control the main motor 130 by feedback-controlling the reference torque current value Iq_ref corresponding to torque. During high-speed rotation, however, induced voltage of the main motor 130 increases with the result that the reference torque current value Iq_ref does not increase. For this reason, it is possible to increase torque by adjusting the reference flux current value Id_ref according to the number of times of rotation.

The current control unit 224 performs PID control based on a difference between the reference flux current value Id_ref and the d-axis current value Id and a difference between the reference torque current value Iq_ref and the q-axis current value Iq and outputs a d-axis reference voltage value Vd and a q-axis reference voltage value Vq.

The coordinate conversion unit 225 performs conversion between the d- and q-axis rotating coordinate system and the uvw fixed coordinate system. The coordinate conversion unit 225 converts the d-axis reference voltage value Vd and the q-axis reference voltage value Vq input to the d- and q-axis rotating coordinate system into three-phase reference voltage values Vu, Vv, and Vw and outputs the converted three-phase reference voltage values Vu, Vv, and Vw. The coordinate conversion unit 225 receives the position θ of the rotor 130b detected by the speed/position detection unit 228 to perform conversion between coordinate systems. In addition, as previously described, the coordinate conversion unit 225 converts the three-phase current values on the uvw fixed coordinate system sensed by the current sensing unit 227 into the d-axis current value Id and the q-axis current value Iq on the d- and q-axis rotating coordinate system and outputs the d-axis current value Id and the q-axis current value Iq.

The PWM calculation unit 226 receives a signal of the uvw fixed coordinate system output from the coordinate conversion unit 225 to generate a PWM signal. The PWM calculation unit 226 outputs respective phase PWM signals Vup(+, −), Vvp(+, −), and Vwp(+, −) to the inverter 210 based on the three-phase reference voltage values Vu, Vv, and Vw. According to embodiments, the PWM calculation unit 226 may be included in the inverter 210.

The inverter 210 receives the PWM signals from the PWM calculation unit 226 to directly control power applied to the main motor 130. The inverter 210 outputs the power based on the PWM signals and supplies the output power to the coils of the stator 130a of the main motor 130.

During formation of an agitation water current, the main motor 130 is rotated in a fixed direction to rotate the water current forming units 115 and 116. At this time, the speed command output unit 221 of the controller 220 outputs the reference speed ω_ref, which is the rotational speed of the main motor 130 for properly rotating the water current forming units 115, and the speed control unit 223 of the controller 220 outputs the reference torque current value Iq_ref and the reference flux current value Id_ref based on the reference speed ω_ref.

During formation of the agitation water current, the main motor 130 may be braked (for example, reversing-phase-braked) in a section in which the rotational direction of the main motor 130 is changed. When the speed command output unit 221 outputs the reference speed ω_ref during reversing-phase-braking of the main motor 140, the speed control unit 223 outputs the reference flux current value Id_ref through feedback such that the rotational speed ω of the rotor 130b follows the reference speed ω_ref.

When the speed of the main motor 130 reaches the target speed, the controller 220 may determine that the acceleration step (S210) has been completed and control the deceleration step (S230) of decelerating the main motor 130 to be executed. At the deceleration step (S230), the controller 220 may interrupt current applied to the main motor 130 so as to brake the main motor 13. Alternatively, the controller 220 may control current having a phase opposite to that of the current at the acceleration step (S210) to be applied to the main motor 130.

At the deceleration step (S230), a deceleration slope of the main motor 130 may have various values according to embodiments. For example, FIG. 5(a) shows that the main motor 130 is braked at a higher deceleration slope than in FIG. 5(b).

The sensing step (S200) may further include a speed maintenance step (S220) at which the main motor 130 is rotated while being maintained at a fixed speed for a predetermined period of time after the acceleration step (S210). Upon sensing that the rotational speed of the main motor 130 reaches the target speed after the acceleration step (S210), the controller 220 may control the main motor 130 to be driven for a predetermined period of time while being maintained at the target speed and then control the deceleration step (S230) to be executed (see FIG. 5(d)). The re-switching step (S500) may be executed based on a current value applied to the main motor 130 during execution of the sensing step (S200).

A current value applied to the main motor 130 during execution of the speed maintenance step (S220) may be sensed, and the controller 220 may compare the sensed current value with the reference value 10 and determine whether to execute the re-switching step (S500) based thereon (S300).

At this time, the current value compared with the reference value 10 at the determination step (S300) may be the average value of current applied to the main motor 130 during execution of the speed maintenance step (S220). In a case in which the average value does not satisfy the reference value 10, the controller 220 may control the re-switching step (S500) to be executed.

Alternatively, the re-switching step (S500) may be executed when the maximum value of current applied to the main motor 130 during execution of the sensing step (S200) does not satisfy the reference value 10. The maximum current value may be a current value at the maximum overshoot. In the agitation mode, a load of the main motor 130 may be only the pulsator 116. In the agitation mode, the rotational direction of the main motor 130 is alternately changed to form an agitation water current. The agitation mode is mainly used in a washing cycle. The agitation mode provides an effect of rubbing laundry to wash the laundry. In the agitation mode, only the pulsator 116 is rotated in a state in which the inner tub 115 is stopped. In the agitation mode, therefore, a higher load is applied to the main motor 130 than in the spin mode. In addition, an alternating cycle of the main motor 130 is short with the result that a current application interval is very small. Furthermore, it is necessary to repeatedly reverse a current phase of the current applied to the main motor 130 such that the rotational direction of the main motor 130 can be alternated.

According to embodiments, in the agitation mode, loads of the main motor 130 may be both the pulsator 116 and the inner tub 115. In this case, the rotational speeds of the pulsator 116 and the inner tub 115 may be opposite to each other via a planetary gear. The agitation water current may be formed using various methods. For example, the main motor 130 may rotate the pulsator 116 in alternating directions, rotate the inner tub 115 in alternating directions, or simultaneously rotate the inner tub 115 and the pulsator 116 in alternating directions.

In the spin mode, loads of the main motor 130 may be the pulsator 116 and the inner tub 115. In the spin mode, the pulsator 116 and the inner tub 115 may be rotated at the same angular speed. In the spin mode, the pulsator 116 and the inner tub 115 may be rotated in the same direction. In the spin mode, the rotational direction of the main motor 130 is uniformly maintained. In the spin mode, the direction of the rotary water current is uniformly maintained. During the washing cycle, the spin mode and the agitation mode may be alternately executed. The spin mode may be executed during the spin-drying cycle.

In the spin mode, both the inner tub 115 and the pulsator 116 are rotated in the same direction. In the spin mode, therefore, a lower load is applied to the main motor 130 than in the agitation mode. In addition, the rotational direction of the main motor 130 is not changed and thus initial rotation of the main motor 130 is possible. As a result, a current application interval is larger than in the agitation mode. Furthermore, reversal of a current phase of the current applied to the main motor 130 is not necessary.

Referring to FIG. 5(a), the sensing step (S200) may include the acceleration step (S210). Referring to FIG. 5(b), the sensing step (S200) may include the deceleration step (S230) in addition to the acceleration step (S210). Referring to FIG. 5(c), the sensing step (S200) may include the acceleration step (S210) and the speed maintenance step (S220). Referring to FIG. 5(d), the sensing step (S200) may include the acceleration step (S210), the speed maintenance step (S220), and the deceleration step (S230).

A current value applied to the main motor 130, which is compared with the reference value 10 at the determination step (S300) may be a current value applied to the main motor 130 at a specific time of the acceleration step (S210), the speed maintenance step (S220), or the deceleration step (S230), the average value of current applied to the main motor 130 during execution of any one selected from among the acceleration step (S210), the speed maintenance step (S220), and the deceleration step (S230), or the maximum value of current applied to the main motor 130 during execution of any one selected from among the acceleration step (S210), the speed maintenance step (S220), and the deceleration step (S230). In a case in which the sensing step (S200) includes the speed maintenance step (S220) (for example, FIGS. 5(b) and 5(c)), the controller 220 may compare the average value of the current applied to the main motor 130 during execution of the speed maintenance step (S220) with the reference value 10 and control the re-switching step (S500) to be executed based on the comparison result.

Figure 6:
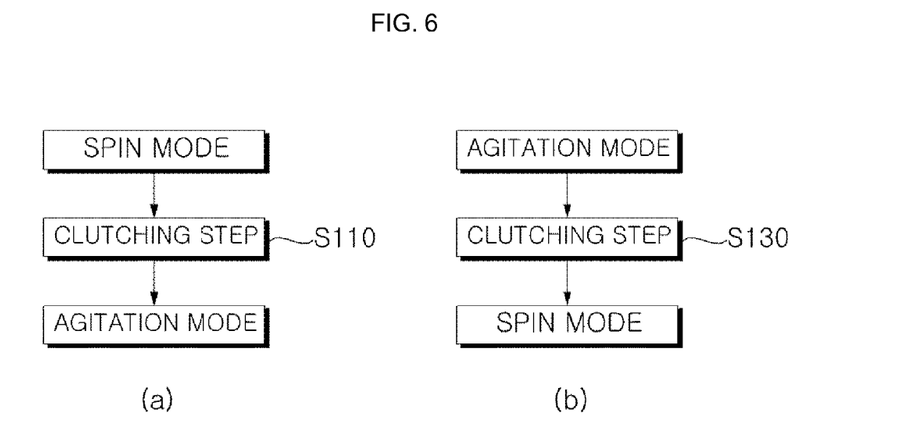
FIG. 6 is a view showing a switching step at each mode.
Figure 7:
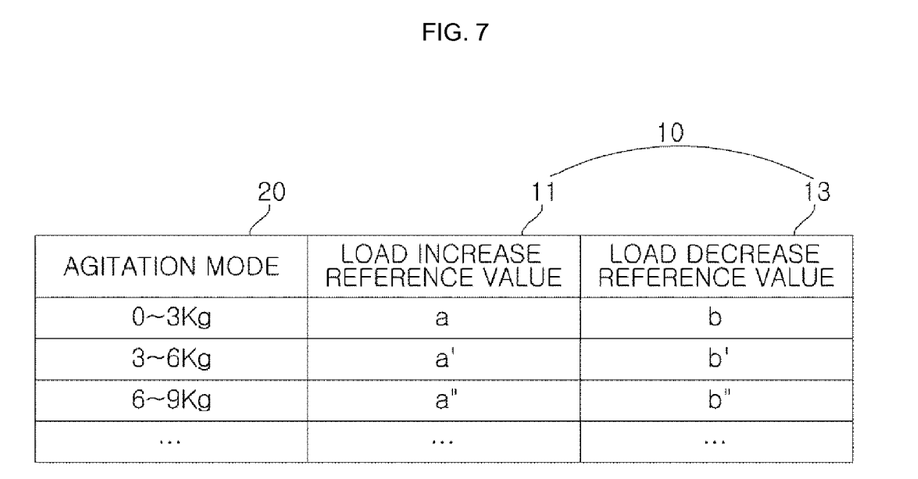
FIG. 7 is a reference value table stored in a database.
Figure 8:
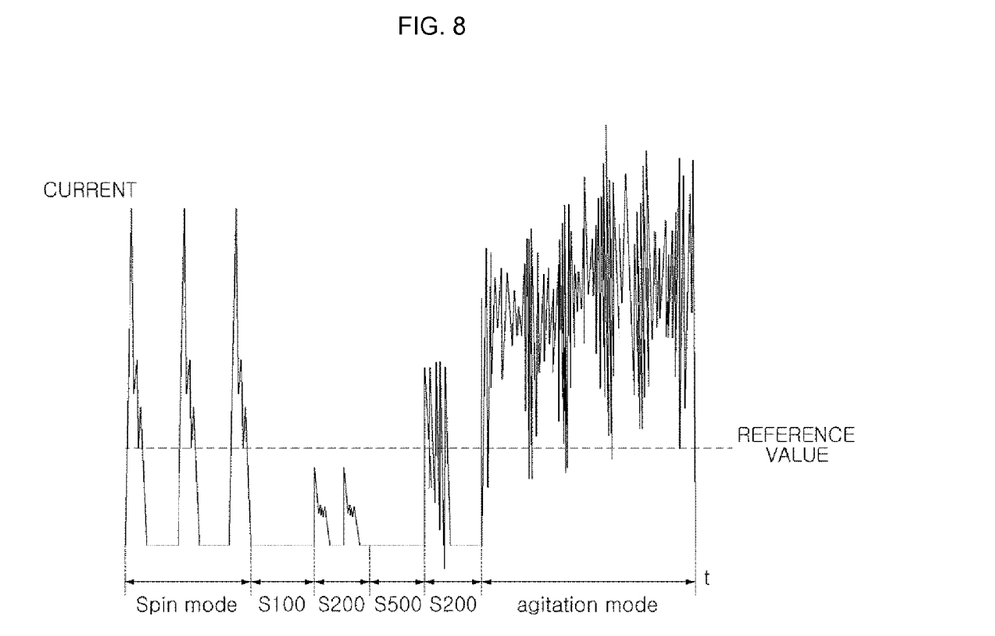
FIG. 8 is a view showing a current waveform during execution of the control method of the washing machine shown in FIG. 3.

FIG. 6 is a view showing the switching step (S100) at each mode. FIG. 7 is a reference value table stored in a database (DB) 230. FIG. 8 is a view showing a current waveform during execution of the control method of the washing machine 100 shown in FIG. 3. The controller 220 may compare a current value applied to the main motor 130 at the speed maintenance step (S220) with the reference value 10 and control the re-switching step (S500) to be executed based on the comparison result.

The reference value 10 may be decided in consideration of the increase and decrease of a load based on laundry weight 20. The laundry weight 20 may be sensed by a laundry weight sensing unit 250. The laundry weight sensing unit 250 may decide the laundry weight 20 based on a time necessary to accelerate the main motor 130 to a predetermined speed. Alternatively, the laundry weight sensing unit 250 may decide the laundry weight 20 based on a load applied to the outer tub 112. However, the present disclosure is not limited thereto. Various technologies for sensing laundry weight are well known in the field related to the washing machine. The laundry weight sensing unit 250 may sense the laundry weight 20 using such well-known technologies.

When the laundry weight is increased, the load applied to the main motor 130 is also increased. Consequently, the reference value 10 may be increased. As can be seen from the table shown in FIG. 7, the reference value 10 may be set based on the laundry weight. In particular, as the laundry weight is increased, the reference value 10 may be set to a higher value. In addition, a switched state achieved at the switching step (S100) as well as the laundry weight may be considered in selecting the reference value 10. In the table shown in FIG. 7, a load increase reference value 11 is set so as to correspond to each laundry weight 20 in a case in which the mode is switched from the spin mode to the agitation mode at the switching step (S100), and a load decrease reference value 13 is set so as to correspond to each laundry weight 20 in a case in which the mode is switched from the agitation mode to the spin mode at the switching step (S100).

The reference value 10 based on the laundry weight 20 is stored in the database 230. The database 230 communicates in data with the controller 220. The controller 220 sets the load increase reference value 11 or the load decrease reference value 13 as the reference value 10 to be compared with the current value at the determination step (S300) based on the measured laundry weight 20 and determination as to whether the mode switched at the switching step (S100) is the agitation mode or the spin mode.

Hereinafter, execution conditions of the re-switching step (S500) will be described based on two embodiments of the switching step (S100). At this time, by way of example, the agitation mode is a mode in which the main motor 130 is controlled such that the rotational direction of the main motor 130 is alternately changed in a state in which the rotary shaft of the main motor 130 is disengaged from the inner tub 115 and engaged with the pulsator 116, and the spin mode is a mode in which the main motor 130 is controlled such that the main motor 130 is continuously rotated in a fixed direction in a state in which the rotary shaft of the main motor 130 is engaged with both of the inner tub 115 and the pulsator 116.

(1) A Case in which the Mode is Switched from the Spin Mode to the Agitation Mode at the Switching Step (S100)

FIG. 6(a) is a flowchart showing a process of switching the mode from the spin mode to the agitation mode. The switching step (S100) may include a clutching step (S110) of driving the clutch 240 such that the rotary shaft of the main motor 130 is disengaged from the inner tub 115.

The determination step (S300) (see FIG. 3) is a step of determining whether a state in which the agitation mode can be executed (for example, a state in which the rotary shaft of the main motor 130 is disengaged from the inner tub 115 such that only the pulsator 116 can be rotated) is achieved at the clutching step (S110). At the determination step (S300), the controller 220 determines that the mode has been normally switched in a case in which the current applied to the main motor 130 during execution of the sensing step (S200) is greater than the reference value 10 and determines that the inner tub 115 is not disengaged from the main motor 130 although the clutching step (S110) has been executed in an opposite case (that is, in a case in which the current value applied to the main motor 130 during execution of the sensing step (S200) is less than the reference value 10). In the latter case, the controller 220 controls the clutch 240 to be driven once again such that the rotary shaft of the main motor 130 is disengaged from the inner tub 115 (S500).

The clutch 240 may include an engagement motor for generating switching power to switch an object to which rotary power of the main motor 130 is transmitted. In this case, at the clutching step (S110), the controller 220 may control the engagement motor to be driven. In the agitation mode, a higher load is applied to the main motor 130 than in the spin mode. In a case in which the current value applied to the main motor 130 is greater than the reference value 10, therefore, the controller 220 determines that the clutch 24 has been normally driven. In a case in which the current value applied to the main motor 130 is less than the reference value 10, on the other hand, the controller 220 determines that the current mode is still the spin mode and controls the re-switching step (S500) to be executed. At the re-switching step (S500), the control 220 may control the engagement motor to be driven.

The database (DB) 230 stores a plurality of reference values 10. In a case in which the switching step (S100) includes the clutching step (S110) of switching the mode from the spin mode to the agitation mode, the controller 220 compares the current value applied to the main motor 130, sensed at the sensing step (S200), with the load increase reference value 11 stored in the database 230. In a case in which the switching step (S100) includes a clutching step (S130) of switching the mode from the agitation mode to the spin mode, on the other hand, the controller 220 compares the current value input to the main motor 130, sensed at the sensing step (S200), with the load decrease reference value 13 stored in the database 230.

In a case in which, when the current applied to the main motor 130 during execution of the sensing step (S200) is compared with the predetermined reference value 10 at the determination step (S300), the current value is equal to or greater than the reference value 10, the controller 220 determines that the clutch 240 has been normally operated and thus the inner tub 115 is disengaged from the rotary shaft of the main motor 130 and controls the main motor 130 to be driven such that the agitation mode is executed.

On the other hand, in a case in which it is determined at the determination step (S300) that the current value is less than the reference value 10, the controller 220 controls the clutch 240 to be driven such that the re-switching step (S500) is executed.

As shown in FIG. 3, the re-switching step (S500) is repeated until the current value applied to the main motor 130 during execution of the sensing step (S200) is greater than the reference value 10. When the number of times of operation of the clutch 240 exceeds a predetermined number of times, the controller 220 may control an error message to be output through an error message output unit.

Referring to FIG. 7, the reference value 10 may be set based on the weight of laundry introduced into the inner tub 115 (hereinafter, referred to as laundry weight). At this time, the load increase reference value 11 has a relationship of a">a'>a. The load decrease reference value 13 has a relationship of b">b'>b. According to embodiments, when laundry weights are the same, the load increase reference value 11 may be set to be higher than the load decrease reference value 13 (a>b, a'>b', and a">b").

(2) A Case in which the Mode is Switched from the Agitation Mode to the Spin Mode at the Switching Step (S100)

FIG. 6(b) is a flowchart showing a process of switching the mode from the agitation mode to the spin mode. The switching step (S100) may include a clutching step (S130) of driving the clutch 240 such that the rotary shaft of the main motor 130 is engaged with the inner tub 115. At the clutching step (S130), the controller 220 may control the engagement motor to be driven.

The determination step (S300) (see FIG. 3) is a step of determining whether a state in which the spin mode can be executed (for example, a state in which the rotary shaft of the main motor 130 is engaged with the inner tub 115 such that the inner tub 115 and the pulsator 116 can be simultaneously rotated) is achieved at the clutching step (S130). At the determination step (S300), the controller 220 determines that the mode has been normally switched in a case in which the current applied to the main motor 130 during execution of the sensing step (S200) is less than the reference value 10 and determines that the inner tub 115 is not engaged with the rotary shaft of the main motor 130 although the clutching step (S130) has been executed in an opposite case (that is, in a case in which the current value applied to the main motor 130 during execution of the sensing step (S200) is equal to or greater than the reference value 10). In the latter case, the controller 220 controls the clutch 240 to be driven once again such that the rotary shaft of the main motor 130 is engaged with the inner tub 115 (S500).

In a case in which, when the current applied to the main motor 130 during execution of the sensing step (S200) is compared with the predetermined reference value 10 at the determination step (S300), the current value is less than the reference value 10, the controller 220 determines that the clutch 240 has been normally operated and thus the inner tub 115 is engaged with the rotary shaft of the main motor 130 and controls the main motor 130 to be driven such that the spin mode is executed.

On the other hand, in a case in which it is determined at the determination step (S300) that the current value is greater than the reference value 10, the controller 220 controls the clutch 240 to be driven such that the re-switching step (S500) is executed.

As shown in FIG. 3, the re-switching step (S500) is repeated until the current value applied to the main motor 130 during execution of the sensing step (S200) is less than the reference value 10. When the number of times of operation of the clutch 240 exceeds a predetermined number of times, the controller 220 may control an error message to be output through the error message output unit.

The clutching step (S110) is executed to switch the mode from the spin mode to the agitation mode. The clutching step (S130) is executed to switch the mode from the agitation mode to the spin mode. The switching step (S100) may include any one selected from between the clutching step (S110) and the clutching step (S130). In the spin mode, a lower load is applied to the main motor 130 than in the agitation mode. Consequently, the current value applied to the main motor 130 before the switching step (S100) is different from that after the switching step (S100). The reference value 10 may be decided between the average value of the current applied to the main motor 130 in the spin mode and the average value of the current applied to the main motor 130 in the agitation mode.

For example, it is assumed that a current value is I1 when current is applied to the main motor 130 such that the main motor 130 can be rotated at the predetermined target speed in a state in which the rotary shaft of the main motor 130 is normally engaged with the pulsator 116 and the inner tub 115 in the spin mode, and a current value is I2 when current is applied to the main motor 130 such that the main motor 130 can be rotated at the predetermined target speed in a state in which the rotary shaft of the main motor 130 is normally engaged with the pulsator 116 and is disengaged from the inner tub 115 in the agitation mode. The reference value 10 may be greater than I1 and less than I2. In addition, I1 and I2 may be changed based on laundry weight. Consequently, the reference value 10 may be changed based on the laundry weight (see FIG. 7).

The control method of the washing machine may further include a step (S600) of outputting an error message when the number of times of execution of the re-switching step (S500) exceeds a predetermined number of times. For example, the number of times n may be 3. Upon determining at the determination step (S300) that the mode switching has not been normally achieved although the re-switching step (S500) was executed three times by repeating the cycle from steps S200 to S500, it is necessary to consider a possibility that the clutch 240 has been damaged. In this case, therefore, the re-switching step (S500) is not executed any longer and the error message is output (S400). The error message may be output through an error message output unit (not shown). The error message output unit may include a speaker for aurally outputting an error message in the form of a sound (for example, an alarm or a beep sound) and a display unit for visually outputting an error message in the form of text or a symbol).

A washing machine 100 according to an embodiment of the present disclosure includes a cabinet forming the external appearance thereof, a plurality of water current forming units 115 and 116 rotatably disposed in the cabinet, a main motor 130 having at least one selected from between the water current forming units 115 and 116 as a load, a clutch 240 for switching the load of the main motor 130 between the water current forming units 115 and 116, an inverter 210 for applying following current to the main motor 130 such that the main motor 130 can be rotated at a predetermined target speed after the clutch 240 is driven, and a controller 220 for re-driving the clutch 240 when the following current does not satisfy a predetermined reference value 10.

The clutch 240 is a power switching unit. The clutch 240 transmits rotary power of the main motor 130 to the pulsator 116 and/or the inner tub 115. The clutch 240 switches between loads of the main motor 130. A plurality of water current forming units 115 and 116 may be provided. The water current forming units 115 and 116 may be the inner tub 115 and the pulsator 116. The main motor 130 generates rotary power to be supplied to the inner tub 115 and the pulsator 116. The pulsator 116 and the inner tub 115 are rotated to form a rotary water current, which is a stream of wash water.

The controller 220 may realize an agitation mode and a spin mode. In the agitation mode, the main motor 130 may be rotated in alternating directions, and in the spin mode, the main motor 130 may be rotated in one direction. Alternatively, in the agitation mode, the pulsator 116 and the inner tub 115 may be rotated in opposite directions, and in the spin mode, the pulsator 116 and the inner tub 115 may be simultaneously rotated in the same direction.

When driving of the clutch 240 is completed, the inverter 210 applies a following current to the main motor 130. The following current is a current value necessary to rotate the main motor 130 at the target speed. The controller 220 controls driving of the clutch 240 to realize a plurality of modes. The controller 220 may control the clutch 240 to be re-driven until the following current value satisfies the reference value 10.

The washing machine 100 according to the embodiment of the present disclosure further includes a database (DB) 230 for separately storing a load increase reference value 11 necessary for the main motor 130 to satisfy a following speed in a case in which a load is increased due to driving of the clutch 240 and a load decrease reference value 13 necessary for the main motor 130 to satisfy the following speed due to driving of the clutch 240.

The database (DB) 230 stores a plurality of reference values 10. In a case in which the switching step (S100) includes a load increase step (S110), the controller 220 selects the load increase reference value 11. In a case in which the switching step (S100) includes a load decrease step (S130), the controller 220 selects the load decrease reference value 13. The load increase reference value 11 is applied when the mode is switched from the spin mode to the agitation mode. The load decrease reference value 13 is applied when the mode is switched from the agitation mode to the spin mode. The reference value 10 may be differently decided based on laundry weight 20, which affects the load of the main motor 130. The laundry weight 20 may be sensed by measuring a required acceleration time of the main motor 130.

The laundry weight 20 may be calculated based on a load applied to the outer tub. When the laundry weight is increased, the load applied to the main motor 130 is also increased. Consequently, the reference value 10 is also increased. The reference value 10 corresponding to the laundry weight 20 is stored in the database (DB) 230. The database (DB) 230 is connected to the controller 220. The controller 220 sets the reference value 10 based on the measured laundry weight 20 and determination as to whether the next mode to be executed is the agitation mode or the spin mode.

Based on the present disclosure, it is possible to prevent damage to the clutch although the clutch is abnormally operated. Further, it is possible to inform a user of damage to the washing machine. It should be noted that effects of the present disclosure are not limited to the effects of the present disclosure as mentioned above, and other unmentioned effects of the present disclosure may be appreciated by those skilled in the art.

It is an object of the present disclosure to determine whether a clutch of a washing machine has performed switching between loads or not.

In accordance with an aspect of the present disclosure, the above and other objects can be accomplished by the provision of a control method of a washing machine including an inner tub, a pulsator rotated in the inner tub, a main motor for rotating the pulsator, and a clutch for engaging the inner tub with the main motor or disengaging the inner tub from the main motor, the control method including (a) executing a first mode corresponding to any one selected from between an agitation mode for driving the main motor in a state in which the inner tub is disengaged from the main motor to rotate the pulsator and a spin mode for driving the main motor in a state in which the inner tub is engaged with the main motor to rotate both the inner tub and the pulsator, (b) operating the clutch such that a second mode corresponding to the other selected from between the agitation mode and the spin mode can be executed, (c) applying current to the main motor such that the main motor can be rotated at a predetermined target speed, (d) comparing a value of the current applied to the main motor with a predetermined reference value to determine whether the second mode can be executed, and (e) executing the second mode according to a determination result at step (d).

The first mode may be the spin mode, the second mode may be the agitation mode, and the agitation mode may be executed in a case in which a comparison result at step (d) indicates that the current value applied to the main motor is equal to or greater than the reference value.

Step (b) may be re-executed in a case in which the comparison result at step (d) indicates that the current value applied to the main motor is less than the reference value. Steps (C), (d), and (e) may be sequentially executed after step (b) is re-executed. Steps (b), (C), (d), and (e) may be repeatedly executed until the comparison result at step (d) indicates that the current value applied to the main motor is equal to or greater than the reference value, and the control method may further include outputting an error message through an error message output unit when the number of times of execution of step (b) exceeds a predetermined number of times.

Step (d) may include comparing an average value of the current applied to the main motor during rotation of the main motor in a state in which the main motor is maintained at the target speed with the reference value.

Step (d) may include comparing a maximum value of the current applied to the main motor during rotation of the main motor in a state in which the main motor is maintained at the target speed with the reference value.

The first mode may be the agitation mode, the second mode may be the spin mode, and the spin mode may be executed in a case in which a comparison result at step (d) indicates that the current value applied to the main motor is less than the reference value. Step (b) may be re-executed in a case in which the comparison result at step (d) indicates that the current value applied to the main motor is equal to or greater than the reference value. Steps (C), (d), and (e) may be sequentially executed after step (b) is re-executed. Steps (b), (C), (d), and (e) may be repeatedly executed until the comparison result at step (d) indicates that the current value applied to the main motor is less than the reference value and wherein the control method further comprises outputting an error message through an error message output unit when the number of times of execution of step (b) exceeds a predetermined number of times.

Step (d) may include comparing an average value of the current applied to the main motor during rotation of the main motor in a state in which the main motor is maintained at the target speed with the reference value.

Step (d) may include comparing a maximum value of the current applied to the main motor during rotation of the main motor in a state in which the main motor is maintained at the target speed with the reference value.

The reference value may be set within a range equal to or greater than an average current value when current is applied to the main motor such that the main motor is rotated while being maintained at the target speed in a state in which the inner tub is engaged with the main motor and equal to or less than an average current value when current is applied to the main motor such that the main motor is rotated at the target speed in a state in which the inner tub is disengaged from the main motor.

The control method may further include sensing laundry weight and setting the reference value based on the sensed laundry weight. The reference value may be set to have a higher value as the laundry weight is increased.

In accordance with another aspect of the present disclosure, there is provided a control method of a washing machine including an inner tub, a pulsator rotated in the inner tub, a main motor for rotating the pulsator, and a clutch for engaging the inner tub with the main motor or disengaging the inner tub from the main motor, the control method including (a) executing a first mode corresponding to any one selected from between an agitation mode for driving the main motor in a state in which the inner tub is disengaged from the main motor to rotate the pulsator and a spin mode for driving the main motor in a state in which the inner tub is engaged with the main motor to rotate both the inner tub and the pulsator, (b) stopping the main motor, (c) operating the clutch such that a second mode corresponding to the other selected from between the agitation mode and the spin mode can be executed, (d) accelerating the main motor until the main motor reaches a predetermined target speed and then stopping the main motor, (e) comparing a maximum value of current applied to the main motor during execution of step (d) with a predetermined reference value to determine whether the second mode can be executed, and (f) executing the second mode according to a determination result at step (e).

Step (d) may include rotating the main motor in a state in which the main motor is maintained at the target speed.

The first mode may be the spin mode, the second mode may be the agitation mode, and the agitation mode may be executed in a case in which a comparison result at step (e) indicates that the current value applied to the main motor is equal to or greater than the reference value.

The first mode may be the agitation mode, the second mode may be the spin mode, and the spin mode may be executed in a case in which a comparison result at step (e) indicates that the current value applied to the main motor is less than the reference value.

The control method may further include sensing laundry weight and setting the reference value based on the sensed laundry weight.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A control method of a washing machine comprising an inner tub, a pulsator rotatable in the inner tub, a main motor configured to rotate the pulsator, and a clutch configured to engage the inner tub with the main motor or disengage the inner tub from the main motor, the control method comprising:
   (a) executing a spin mode for driving the main motor in a state in which the inner tub is engaged with the main motor to rotate both the inner tub and the pulsator;

(b) operating the clutch for execution of an agitation mode for driving the main motor in a state in which the inner tub is disengaged from the main motor to rotate the pulsator;

(c) applying current to the main motor such that the main motor can be rotated at a predetermined target speed;

(d) comparing a value of the current applied to the main motor with a predetermined reference value to determine whether the agitation mode can be executed; and (e) executing the agitation mode when a comparison result at step (d) indicates that the current value applied to the main motor is equal to or greater than the reference value, wherein step (b) is re-executed when the comparison result at step (d) indicates that the current value applied to the main motor is less than the reference value.

2. The control method according to claim 1, wherein steps (c), (d), and (e) are sequentially executed after step (b) is re-executed.

3. The control method according to claim 2, wherein steps (b), (c), (d), and (e) are repeatedly executed until the comparison result at step (d) indicates that the current value applied to the main motor is equal to or greater than the reference value, the control method further comprising outputting an error message through an error message output unit when the number of times of execution of step (b) exceeds a predetermined number of times.

4. The control method according to claim 1, wherein step (d) comprises comparing an average value of the current applied to the main motor with the reference value while a rotation of the main motor is maintained at a target speed.

5. The control method according to claim 1, wherein step (d) comprises comparing a maximum value of the current applied to the main motor with the reference value while a rotation of the main motor is maintained at a target speed.

6. The control method according to claim 1, wherein the reference value is set within a prescribed range equal to or greater than an average current value when a current is applied to the main motor for maintaining a rotation of the main motor at the target speed in a state in which the inner tub is engaged with the main motor and equal to or less than an average current value when the current is applied to the main motor for maintaining the rotation of the main motor at the target speed in a state in which the inner tub is disengaged from the main motor.

7. The control method according to claim 1, further comprising:
sensing laundry weight; and
setting the reference value based on the sensed laundry weight.

8. The control method according to claim 7, wherein the reference value is set to have a higher value as the laundry weight is increased.

9. A control method of a washing machine comprising an inner tub, a pulsator rotatable in the inner tub, a main motor configured to rotate the pulsator, and a clutch configured to engage the inner tub with the main motor or disengage the inner tub from the main motor, the control method comprising:

(a) executing an agitation mode for driving the main motor in a state in which the inner tub is disengaged from the main motor to rotate the pulsator;

(b) operating the clutch for execution of a spin ode for driving the main motor in a state in which the inner tub is engaged with the main motor to rotate both the inner tub and the pulsator;

(c) applying current to the main motor such that the main motor can be rotated at a predetermined target speed;

(d) comparing a value of the current applied to the main motor with a predetermined reference value to determine whether the spin mode can be executed; and (e) executing the spin mode when a comparison result at step (d) indicates that the current value applied to the main motor is less than the reference value, wherein step (b) is re-executed when the comparison result at step (d) indicates that the current value applied to the main motor is equal to or greater than the reference value.

10. The control method according to claim 9, wherein steps (c), (d), and (e) are sequentially executed after step (b) is re-executed.

11. The control method according to claim 10, wherein steps (b), (c), (d), and (e) are repeatedly executed until the comparison result at step (d) indicates that the current value applied to the main motor is less than the reference value, the control method further comprising outputting an error message through an error message output unit when the number of times of execution of step (b) exceeds a predetermined number of times.

12. The control method according to claim 9, wherein step (d) comprises comparing an average value of the current applied to the main motor with the reference value while a rotation of the main motor is maintained at the target speed.

13. The control method according to claim 9, wherein step (d) comprises comparing a maximum value of the current applied to the main motor with the reference value while a rotation of the main motor is maintained at a target speed.

14. The control method according to claim 9, wherein the reference value is set within a prescribed range equal to or greater than an average current value when a current is applied to the main motor for maintaining a rotation of the main motor at the target speed in a state in which the inner tub is engaged with the main motor and equal to or less than an average current value when the current is applied to the main motor for maintaining the rotation of the main motor at the target speed in a state in which the inner tub is disengaged from the main motor.

15. A control method of a washing machine comprising an inner tub, a pulsator rotatable in the inner tub, a main motor configured to rotate the pulsator, and a clutch configured to engage the inner tub with the main motor or disengage the inner tub from the main motor, the control method comprising:

(a) executing a spin mode for driving the main motor in a state in which the inner tub is engaged with the main motor to rotate both the inner tub and the pulsator;

(b) stopping the main motor;

(c) operating the clutch for execution of an agitation mode for driving the main motor in a state in which the inner tub is disengaged from the main motor to rotate the pulsator;

(d) accelerating the main motor until the main motor reaches a predetermined target speed and then stopping the main motor;

(e) comparing a maximum value of current applied to the main motor during execution of step (d) with a predetermined reference value to determine whether the agitation mode can be executed; and (f) executing the agitation mode when a comparison result at step (e) indicates that the current value applied to the main motor is equal to or greater than the reference value, wherein step (b) is re-executed when the comparison result at step (e) indicates that the current value applied to the main motor is less than the reference value.

16. The control method according to claim 15, further comprising:
sensing laundry weight; and
setting the reference value based on the sensed laundry weight.

17. The control method according to claim 15, wherein step (d) comprises maintaining a rotation of the main motor at the target speed.

18. A control method of a washing machine comprising an inner tub, a pulsator rotatable in the inner tub, a main motor configured to rotate the pulsator, and a clutch configured to engage the inner tub with the main motor or disengage the inner tub from the main motor, the control method comprising:
  (a) executing an agitation mode for driving the main motor in a state in which the inner tub is disengaged from the main motor to rotate the pulsator;
  (b) stopping the main motor;
  (c) operating the clutch for execution of a spin mode for driving the main motor in a state in which the inner tub is engaged with the main motor to rotate both the inner tub and the pulsator;
  (d) accelerating the main motor until the main motor reaches a predetermined target speed and then stopping the main motor;
  (e) comparing a maximum value of current applied to the main motor during execution of step (d) with a predetermined reference value to determine whether the agitation mode can be executed; and
  (f) executing the spin mode when a comparison result at step (e) indicates that the current value applied to the main motor is less than the reference value,
wherein step (b) is re-executed when the comparison result at step (e) indicates that the current value applied to the main motor is equal to or greater than the reference value.

19. The control method according to claim 18, further comprising:
sensing laundry weight; and
setting the reference value based on the sensed laundry weight.

20. The control method according to claim 18, wherein step (d) comprises maintaining a rotation of the main motor at the target speed.

* * * * *